United States Patent Office 3,824,252
Patented July 16, 1974

3,824,252
PROCESS FOR PREPARING INDOLE
Marcello Massi Mauri, San Donato Milanese, and Pietro Antonio Moggi and Ugo Romano, Milan, Italy, assignors to Snam Progetti S.p.A., Milan, Italy
No Drawing. Filed Sept. 3, 1971, Ser. No. 177,866
Claims priority, application Italy, Sept. 7, 1970, 29,423/70
Int. Cl. C07d 27/56
U.S. Cl. 260—319.1
13 Claims

ABSTRACT OF THE DISCLOSURE

Process for producing indole and its derivatives by oxidizing aromatic amines with an organic nitrocompound at temperatures ranging from 300° C. to 700° C. in the vapor phase in the presence of contact masses.

---

The present invention refers to a process for preparing heterocyclic compounds.

More particularly it refers to a process for preparing indole and derivative of same by oxidizing an aromatic substituted amine with an organic nitrocompound in the vapour phase and in presence of contact masses.

Many industrially interesting heterocyclic compounds have been synthesized particularly indole starting from o-ethylaniline, but the methods for their preparation often employ very expensive raw materials and/or catalysts and are based on difficult processes which often give rise to very low yields of the final product.

According to the present invention there is provided a process for obtaining indole and its derivatives at high yields in a simple and cheap way, by which the product is obtained at very high selectivity and the formation of undesirable by-products is avoided.

According to the inventive process, a substituted aromatic amine is oxidized in vapour phase at high temperature by organic nitrocompound in presence of contact masses. Said process may be carried out on many substituted aromatic amines which may be exemplified by the following general formula:

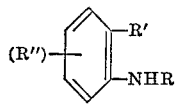

wherein R may be hydrogen, an alkyl or an aryl radical, R' is an alkyl radical having at least two carbon atoms, R" may be hydrogen, an alkyl or an aryl radical, or a nitro-, halogen-, cyano-, amino-, alcoxy-, —OH, —SH, —SO$_3$H group, or a divalent radial giving rise to a condensed ring.

The process according to the present invention is carried out in a reactor which may be of the fixed, moving or fluid bed type, in the presence of a suitable contact mass preferably consisting of silica or silica material as, for example, celite.

The contact time is selected in the range from 0.1 to 20 seconds, and preferably in the range from 1 to 10 seconds.

As contact time between reactants and catalyst we mean the ratio between the volume of the catalytic bed and the flow of the reactants as gases at the reaction conditions.

The inventive process is carried out at temperatures ranging from 300° C. to 700° C., preferably the 450–600° C. range.

The pressure may vary over a wide range, it being no critical factor in carrying out the process of the present invention. However, the reaction is preferably carried out at atmospheric pressure.

Advantageously, use is made of a diluent inert to the reaction, for example water, N$_2$, argon, CO$_2$, saturated hydrocarbons. Preferably, use is made of water in a molar ratio to the amine compound ranging between 5:1 to 50:1. According to the present invention the substituted aromatic amine compound is oxidized in the vapour phase by an organic nitrocompound, the molar ratio between the amine compound and the nitrocompound ranging from 0.2:1 to 10:1, preferably from 0.5:1 to 5:1.

The preferred organic compound is nitrobenzene or the ortho-nitroalkylbenzene corresponding to the starting amine compound.

A particularly advantageous industrial application of the inventive process is found when oxidizing o-ethylaniline by nitrobenzene; indole and aniline are obtained as reaction products, and then aniline may be employed as starting material to synthesize o-ethylaniline.

Some other working characteristics will be pointed out in the following unrestrictive examples, hereinafter reported to better illustrate the invention.

In said examples the terms "conversion" and "selectivity" are to be understood as follows:

$$\text{Conversion} = \frac{\text{reacted compound moles}}{\text{fed compound mols}} \cdot 100$$

$$\text{Selectivity} = \frac{\text{obtained product moles}}{\text{reacted compound moles}} \cdot 100$$

Example 1 o-Ethylaniline was oxidized to indole by nitrobenzene. The reaction conditions were the following:

Reactor: int. $\phi = \frac{7}{8}''$, h = 1.3 m.
Mean temperature: 565–570° C.
Pressure: atmospheric
Contact time: 5 seconds
o-Ethylaniline/nitrobenzene molar ratio = 3:2
Diluent: N$_2$
N$_2$/o-ethylaniline molar ratio = 10:1

On Table 1 there are reported the results obtained by comparing two different contact masses: Raschig rings on ceramic material (test A) and silica "Ludox" H.S. extruded as little cilinders (7 x 8 mm.) and calcined at 500° C. (test B).

TABLE 1

| | Test A | Test B |
|---|---|---|
| Conversion o-ethylaniline, percent | 66 | 60 |
| Conversion nitrobenzene, percent | 89 | 99 |
| Selectivity (with respect to o-ethylaniline) indole, percent | 5.5 | 32 |
| o-Aminostyrole, percent | 9 | 14.5 |
| Selectivity (with respect to nitrobenzene) aniline, percent | 12.5 | 31.5 |
| Benzene, percent | (¹) | 36 |

¹ Not determined.

The advantageous use of silica as contact mass is very clear.

Example 2 o-Ethylaniline was oxidized to indole according to the following conditions:

Reactor: $\phi$ int. = $\frac{7}{8}''$
Contact mass:
    silica Ludox H.S. = h. = 1.20 m.
    extruded = v. = 465 cc.
Mean temperature: 565–575° C.
Pressure: atmospheric
Contact time: 5 sec.
o-Ethylaniline/nitrobenzene: 3:2 by moles On Table 2 there are reported the results obtained with and without diluent.

TABLE 2

|  | Diluent | |
| --- | --- | --- |
|  | None | H₂O |
| Moles diluent/moles o-ethylaniline | | 10 |
| Conversion o-ethylaniline, percent | 72 | 75 |
| Conversion nitrobenzene, percent | 94.5 | 99.5 |
| Selectivity (to o-ethylaniline) indole, percent | 8 | 41.5 |
| o-Aminestyrole, percent | 6 | 4.5 |
| Selectivity (to nitrobenzene) aniline, percent | 21 | 25.5 |
| Benzene, percent | 57 | 44.5 |

The advantageous use of an inert diluent is very clear.

Example 3 o-Ethylaniline was oxidized to indole according to the following conditions:

Reactor: φ int.=1.5″
Contact mass:
  Celite h.=0.55 m.
  As cylinders (4 x 4 mm.) v.=600 cc.
Mean temperature: 570° C.
Pressure: atmospheric
Contact time: 4 sec.
o-Ethylaniline/nitrobenzene=2:1 b.m.
Diluent/o-ethylaniline molar ratio=20:1

On Table 3 there are reported the results obtained by comparing different diluents.

TABLE 3

|  | Diluent | |
| --- | --- | --- |
|  | N₂ | H₂O |
| Conversion o-ethylaniline, percent | 53.5 | 53.5 |
| Conversion nitrobenzene, percent | 99.9 | 98.5 |
| Selectivity (to o-ethylaniline) indole, percent | 43 | 55.5 |
| o-Aminestyrole, percent | 11.5 | 14 |
| Selectivity (to nitrobenzene) aniline, percent | 33 | 35 |
| Benzene, percent | 32 | 31 |

The advantageous use of H₂O as reaction diluent is very clear.

Example 4 o-Ethylaniline was oxidized to indole according to the following conditions:

Reactor: φ int.=1.5″
Contact time:
  Celite=h.=0.55 m.
  v.=600 cc.
Pressure: atmospheric
Diluent: H₂O
Molar ratio H₂O/(o-ethylaniline-nitrobenzene)=10.1

On Table 4 there are reported the results obtained by working at different contact times and o-ethylaniline/nitrobenzene molar ratios.

TABLE 4

|  | Mean temperature, ° C. | | | | |
| --- | --- | --- | --- | --- | --- |
|  | 530 | 570 | 570 | 570 | 570 |
| Contact time, seconds | 4.5 | 4.5 | 2 | 4.5 | 2 |
| Moles o-ethylaniline/moles nitrobenzene | 2 | 2 | 2 | 0.5 | 5 |
| Conversion o-ethylaniline, percent | 46.5 | 53.5 | 37 | 83.5 | 26 |
| Conversion nitrobenzene, percent | 97.5 | 99 | 96 | 99.5 | 92 |
| Selectivity (to o-ethylaniline) indole, percent | 40 | 55 | 63 | 59 | 47 |
| o-Aminestyrole, percent | 12.5 | 11 | 22 | 4 | 23 |
| Selectivity (to nitrobenzene) aniline, percent | 30 | 35.5 | 34 | 17 | 50 |
| Benzene, percent | 28 | 32 | 34.5 | 38 | 40 |

Example 5 o-Ethylaniline was reacted with nitroethylbenzene in a reactor having the internal diameter of 1.5″ and with a contact mass consisting of celite (h.=0.55 m.-v.=600 cc.).

The mean temperature was 535° C., whereas the pressure was atmospheric.

The contact time was 2.7 sec.

The o-ethylaniline/o-nitroethylbenzene molar ratio was 1, whereas the H₂O/o-ethylaniline molar ratio was 15:1.

The feeding was: G./h.
  o-Ethylaniline _____ 45
  o-Nitroethylbenzene _____ 56
The recovery was:
  o-Ethylaniline _____ 31
The obtained products were:
  Indole _____ 6.1
  o-Aminestyrole _____ 6.8

What is claimed is:

1. A process for producing indole consisting in oxidizing, by nitrobenzene, in the vapor phase, at high temperature and in presence of contact masses selected from the group consisting of silica and celite,

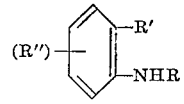

o-ethylaniline giving rise to a condensed ring.

2. A process according to claim 1 characterized in that the reaction is carried out at temperature ranging from 300° C. to 700° C.

3. A process according to claim 1 characterized in that the reaction is carried out at atmospheric pressure.

4. A process according to claim 1 characterized in that the reaction is carried out at a pressure higher than atmospheric.

5. A process according to claim 1 characterized in that the contact mass is celite.

6. A process according to claim 1 characterized in that the contact time ranges from 0.1 to 20 seconds.

7. A process according to claim 1 characterized in that the reaction is carried out in presence of an inert diluent.

8. A process according to claim 7 characterized in that the inert diluent consists of H₂O in a molar ratio to o-ethylaniline ranging from 5:1 to 50:1.

9. A process according to claim 1 characterized in that the molar ratio between o-ethylaniline and nitrobenzene ranges from 0.2:1 to 10:1.

10. A process according to claim 2 wherein the temperature range is from 450° C. to 600° C.

11. A process according to claim 1 wherein the reaction is carried out at a pressure lower than atmospheric.

12. A process according to claim 6 wherein said contact time ranges from 1 to 10 seconds.

13. A process according to claim 9 wherein said molar ratio is from 0.5:1 to 5:1.

References Cited

UNITED STATES PATENTS 3,271,414   9/1966   Frangatos _____ 260—319.1

JOSEPH A. NARCAVAGE, Primary Examiner